US012018569B2

(12) United States Patent
Zink et al.

(10) Patent No.: US 12,018,569 B2
(45) Date of Patent: Jun. 25, 2024

(54) PORTABLE ELECTRICAL ENERGY PRODUCED FROM WASTE GAS OR LIQUID

(71) Applicant: ZEECO, INC., Broken Arrow, OK (US)

(72) Inventors: Darton J. Zink, Tulsa, OK (US); Rex K. Isaacs, Collinsville, OK (US); John Petersen, Pawnee, OK (US)

(73) Assignee: ZEECO, INC., Broken Arrow, OK (US)

( * ) Notice: Subject to any disclaimer, the term of this patent is extended or adjusted under 35 U.S.C. 154(b) by 238 days.

(21) Appl. No.: 16/013,625

(22) Filed: Jun. 20, 2018

(65) Prior Publication Data

US 2019/0390560 A1 Dec. 26, 2019

(51) Int. Cl.

| | |
|---|---|
| ***F01D 15/10*** | (2006.01) |
| ***F01K 3/18*** | (2006.01) |
| ***F01K 3/20*** | (2006.01) |
| ***F01K 7/16*** | (2006.01) |

(52) U.S. Cl.

CPC .............. *F01D 15/10* (2013.01); *F01K 3/185* (2013.01); *F01K 3/20* (2013.01); *F01K 7/16* (2013.01); *F05D 2220/31* (2013.01); *F05D 2220/60* (2013.01)

(58) Field of Classification Search

CPC . F01D 15/10; F01K 3/185; F01K 3/20; F01K 7/16; F05D 2220/31; F05D 2220/60

See application file for complete search history.

(56) References Cited

U.S. PATENT DOCUMENTS

| | | | | |
|---|---|---|---|---|
| 4,057,736 | A | 11/1977 | Jeppson | |
| 6,032,467 | A * | 3/2000 | Oshita | C10K 1/101 60/671 |
| 8,013,567 | B2 | 9/2011 | Windsor | |
| 9,103,193 | B2 * | 8/2015 | Coli | F04B 49/20 |
| 9,145,082 | B2 | 9/2015 | Hindle | |
| 9,828,050 | B2 | 11/2017 | Hindle | |
| 2004/0011523 | A1 | 1/2004 | Sarada | |

(Continued)

FOREIGN PATENT DOCUMENTS

| | | |
|---|---|---|
| CA | 2492082 | * 1/2004 |
| EP | 3255365 | * 12/2017 |

(Continued)

OTHER PUBLICATIONS

PCT International Search Report and Written Opinion; PCT/US2019/037951; dated Sep. 10, 2019; US.

(Continued)

*Primary Examiner* — Phutthiwat Wongwian
*Assistant Examiner* — Diem T Tran
(74) *Attorney, Agent, or Firm* — Dennis D. Brown; Brown Patent Law, P.L.L.C.

(57) ABSTRACT

A method and system in which a waste gas or liquid product is combusted or otherwise used at a well site or other source location to drive a generator to produce electrical energy which is then stored in a portable storage device, such as rechargeable battery or an array of rechargeable batteries, which can subsequently be transported, for example, to a charging station for vehicles or other electrical devices or systems, or to a delivery location for downloading the portable stored electrical energy to a power supply grid.

24 Claims, 3 Drawing Sheets

(56) References Cited

U.S. PATENT DOCUMENTS

| | | | | |
|---|---|---|---|---|
| 2008/0017369 | A1* | 1/2008 | Sarada | E21B 43/40 166/244.1 |
| 2008/0066979 | A1* | 3/2008 | Carter | H02J 7/342 180/65.51 |
| 2008/0135238 | A1* | 6/2008 | Cugnet | E21B 41/005 166/256 |
| 2008/0283247 | A1 | 11/2008 | Zubrin et al. | |
| 2010/0038907 | A1 | 2/2010 | Hunt et al. | |
| 2011/0101794 | A1 | 5/2011 | Schroeder et al. | |
| 2012/0199083 | A1* | 8/2012 | Besmann | F02B 47/04 123/3 |
| 2014/0265326 | A1* | 9/2014 | Allen | F01D 1/18 290/7 |
| 2015/0034320 | A1 | 2/2015 | Zubrin et al. | |
| 2016/0149468 | A1 | 5/2016 | Leslie et al. | |
| 2017/0077467 | A1 | 3/2017 | Kronke et al. | |

FOREIGN PATENT DOCUMENTS

| | | | |
|---|---|---|---|
| EP | 3255365 A1 * | 12/2017 | H05K 7/1497 |
| KR | 10174808 * | 6/2017 | |

OTHER PUBLICATIONS

Shi et al.; Energizing Fuel Cells With an Electrically Rechargeable Liquid Fuel; Cell Reports Physical Sience; Jul. 22, 2020.

* cited by examiner

PORTABLE ELECTRICAL ENERGY PRODUCED FROM WASTE GAS OR LIQUID

FIELD OF THE INVENTION

The present invention relates to methods and apparatuses for (a) generating portable electrical energy from waste gas or liquid products produced from wells or other sources and (b) storing, transporting, and using the portable electrical energy.

BACKGROUND OF THE INVENTION

Combustible waste gas or liquid products are commonly produced from oil and/or gas wells, loading terminals, garbage facilities, and other sources. Unfortunately, wells and other sources of the waste gas or liquid products are typically too remotely located, and the amount of waste gas or liquid produced from the individual source is typically too small, to justify the cost of constructing pipelines or providing other means for recovering the gas or liquid for sale and/or use. Consequently, the waste gas or liquid products produced at these remote sites are typically simply disposed of by flaring.

Moreover, because of the remote locations of the production sources, and the small quantities of waste gas or liquid produced at the individual sites, it has not been economically feasible to extend electrical power lines to the remote sites so that the waste gas or liquid products can be converted to electrical energy which is then delivered to an electrical power supply grid.

SUMMARY OF THE INVENTION

The present invention alleviates the problems and satisfies the needs discussed above.

In one aspect, there is provided a method of producing portable electrical energy from a gas or liquid product produced at a source location, wherein the method preferably comprises the steps of: (a) combusting the gas or liquid product at the source location to directly or indirectly power an electrical generator to produce electrical energy; (b) directly or indirectly delivering the electrical energy produced in step (a) to, and storing the electrical energy in, a portable electrical power storage device or a portable set of electrical power storage devices at the source location; and (c) after step (b), transporting the portable electrical power storage device or the portable set of electrical power storage devices to a different location.

In another aspect, two portable electrical power storage devices or two portable sets of electrical power storage devices can be used in this inventive method and system such that, in step (b), the electrical energy produced in step (a) is indirectly delivered to the second portable electrical power storage device or the second portable set of electrical power storage devices at the source location by: (i) delivering the electrical energy produced in step (a) to, and storing the electrical energy in, the first portable electrical power storage device or the first portable set of electrical power storage devices at the source location and then (ii) delivering the electrical energy stored in the first portable electrical power storage device or the first portable set of electrical power storage devices to, and storing the electrical energy in, the second portable electrical power storage device or the second portable set of electrical power storage devices at the source location.

In this scenario, after charging the second portable electrical power storage device or the second portable set of electrical power storage devices at the waste gas or liquid source location, the second portable electrical power storage device or the second portable set of electrical power storage devices can be transported, for example, by truck, train, barge, boat, or aircraft to a different location for (i) delivering the stored electrical energy to a power supply grid, (ii) charging electric vehicles, (iii) charging other devices, or (iv) other purposes. Also by way of example, as the quantity of waste gas or liquid produced at the source location diminishes over time, and the electrical energy produced at the site declines, the first portable electrical power storage device or the first portable set of electrical power storage devices can be transported to a new source location.

In another aspect, there is provided a method of producing portable electrical energy from a gas or liquid product produced at a source location wherein the method preferably comprises the steps of: (a) combusting a first amount of the gas or liquid product at the source location in an internal combustion engine or a turbine engine to directly or indirectly power a first electrical generator to produce a first amount of electrical energy; (b) directly or indirectly delivering the first amount of electrical energy produced in step (a) to, and storing the first amount of electrical energy in, a portable electrical power storage device or a portable set of electrical power storage devices at the source location; (c) combusting a second amount of the gas or liquid product at the source location to produce a first amount of steam; (d) using an exhaust stream from the internal combustion engine or the turbine engine to produce a second amount of steam at the source location; (e) using the first and the second amounts of steam to drive a steam turbine at the source location which powers a second electrical generator at the source location to produce a second amount of electrical energy; (f) directly or indirectly delivering the second amount of electrical energy to, and storing the second amount of electrical energy in, the portable electric power storage device or the portable set of electrical power storage devices at the source location: and (g) after steps (b) and (f), transporting the portable electrical power storage device or the portable set of electrical power storage devices to a different location.

In another aspect, there is provided a method of producing portable electrical energy from a gas product produced at a source location, wherein the method preferably comprises the steps of: (a) directly or indirectly driving an electrical generator with a flow of the gas product to produce electrical energy; (b) directly or indirectly delivering the electrical energy produced in step (a) to, and storing the electrical energy in, a portable electrical power storage device or a portable set of electrical power storage devices at the source location; and (c) after step (b), transporting the portable electrical power storage device or the portable set of electrical power storage devices to a different location.

In another aspect, there is provided a system for producing portable electrical energy, at a site of one or more oil and/or gas wells, from a gas or liquid product produced by the one or more wells. The system preferably comprises: (a) a combustion system, located at the site, in which the gas or liquid product is combusted; (b) a line through which the gas or liquid product produced by the one or more wells is conducted to the combustion system; (c) an electrical generator, located at the site, which is directly or indirectly powered by the combustion system to produce electrical energy; and (d) a portable electrical power storage device or a portable set of electrical power storage devices, located at the site, which is electrically linked to the electrical generator for receiving and storing the electrical energy.

In another aspect, there is provided a system for producing portable electrical energy, at a site of one or more oil and/or gas wells, from a gas or liquid product produced by the one or more wells, wherein the system preferably comprises: (a) an internal combustion engine or turbine engine, located at the site, in which a first portion of the gas or liquid product is combusted; (b) a first line through which the first portion of the gas or liquid product produced by the one or more wells is conducted to the internal combustion engine or turbine engine; (c) a first electrical generator, located at the site, which is directly or indirectly driven by the internal combustion engine or turbine engine to produce a first amount of electrical energy; (d) a boiler system, located at the site, in which a second portion of the gas or liquid product is combusted to produce steam; (e) a second line through which the second portion of the gas or liquid product produced by the one or more wells is conducted to the boiler system; (f) a steam turbine, located at the site, which is driven by the steam from the boiler system; (g) a second electrical generator, located at the site, which is directly or indirectly driven by the steam turbine to produce a second amount of electrical energy; and (h) a portable electrical power storage device or a portable set of electrical power storage devices, located at the site, which is electrically linked to the first electrical generator and to the second electrical generator for receiving and storing the first and the second amounts of electrical energy.

This system will also preferably comprise (i) a heat exchange element in the boiler system to produce additional steam in the boiler system using an exhaust stream from the internal combustion engine or turbine engine and (ii) a line or duct through which the exhaust stream is conducted to the heat exchange element.

The portable electrical power storage device or the set of such storage devices used in the present invention preferably comprises a rechargeable battery or a set of rechargeable batteries. Also, the portable electrical power storage device or the portable set of such storage devices can be positioned in a cargo container, and/or on or in a non-powered or powered vehicle (e.g., a trailer or a barge), for transporting the portable electrical power storage device or the set of such storage devices by land, on water, or both.

By way of example, but not by way of limitation, the portable electrical power storage device or the portable set of electrical power storage devices can be transported to (a) a location for delivering the electrical energy stored in the portable electrical power storage device or the portable set of electrical power storage devices to an electrical power supply grid or system and/or (b) a charging location for delivering the electrical energy stored in the portable electrical power storage device or the portable set of electrical power storage devices to electric vehicles or to other electrical systems or devices.

The present invention provides valuable, beneficial recovery of energy from waste gas or liquid products which, heretofore, have simply been disposed of by flaring. In addition, due to (a) the more advanced technology available for controlling emissions from internal combustion engines, turbine engines, and/or other systems suitable for use in the present invention for combusting the waste gas or liquid products to produce portable electrical energy and (b) the productive use of the waste gas or liquid products to replace other combustion sources for power production, as opposed to simply flaring the waste gas or liquid products, the present invention also operates to provide: reduced $NO_x$ emissions; reduced carbon monoxide emissions; reduced unburned hydrocarbon emissions (UHC); reduced particulate emissions (PM10); reduced volatile organic compound (VOC) emissions; reduced hazardous air pollutants (HAPs); and reduced carbon dioxide ($CO_2$) emissions.

Further aspects, features, and advantages of the present invention will be apparent to those in the art upon examining the accompanying drawings and upon reading the following Detailed Description of the Preferred Embodiments.

DETAILED DESCRIPTION OF THE PREFERRED EMBODIMENTS

Before explaining the present invention in detail, it is important to understand that the invention is not limited in its application to the details of the preferred embodiments and steps described herein. The invention is capable of other embodiments and of being practiced or carried out in a variety of ways. It is to be understood that the phraseology and terminology employed herein are for the purpose of description and not of limitation.

Figure 1:
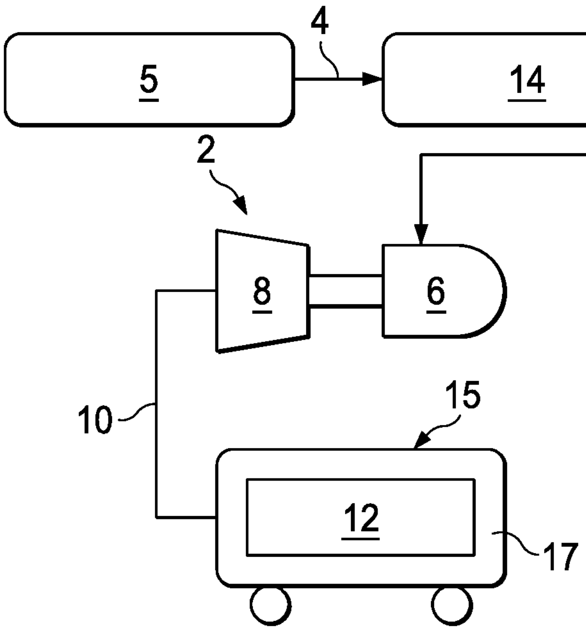
FIG. 1 schematically illustrates an embodiment 2 of the inventive method and system for producing portable electrical energy from a waste gas or liquid product 4.

A first embodiment 2 of the inventive method and system for producing and using portable electrical energy is illustrated in FIG. 1. In the inventive method and system 2, a waste gas or liquid product 4 produced from a source 5 at a source location is combusted in a combustion system 6 in a manner effective for directly or indirectly driving or otherwise powering an electrical generator 8 for producing electrical energy 10. The electrical energy 10 produced by the generator 8 is then delivered to and stored in a portable electrical power storage system 12 which is electrically linked to the generator 8. The waste gas or liquid product 4 produced by the source 5 is conducted to the combustion system 6 via a waste product line 7.

The combustion system 6, the electrical generator 8, and the portable electrical power storage system 12 are all located at the same location (i.e., the source location) where the waste gas or liquid product 4 is produced. However, once charged, the portable electrical power storage system 12 can be disconnected and transported to any other location as may be desired or necessary for (a) delivering the stored electrical energy to an electrical power supply grid or system, (b) charging electrical vehicles, or (c) any other purpose.

As used herein and in the claims, the term "waste gas or liquid product" refers to any combustible hydrocarbon-containing gas or liquid and/or hydrogen-containing gas which is not otherwise recovered as a gas and/or liquid product for transport from the production site (i.e., the source location) by pipeline, truck, train, or other method used for transporting gases or liquids. In many but not all cases, such gases are disposed of by flaring. Examples of waste gas and liquid products which are suitable for use in the method and system of the present invention include, but are not limited to: associated natural gas products which are produced from oil and/or gas wells; methane-containing and other combustible gases produced in landfills or other garbage or waste facilities; off-gases produced in off-shore or on-shore loading facilities for oil, hydrocarbon liquid products, gas products, or liquefied gas products; any combustible waste liquid; and any other combustible waste gas or combustible waste flare gas or liquid.

It will also be understood that, unless otherwise stated, the waste gas or liquid product used in the inventive method and system can be derived from a single well, a single gas vent, or other individual source of the waste gas or liquid product at the source location, or can alternatively be a combined waste gas or liquid stream derived from a plurality of wells, gas vents, or other sources at a source location such as, e.g., a well site, an oil and/or gas field, a landfill, or a loading facility.

The combustion system 6 used in the inventive method and system 2 illustrated in FIG. 1 is an internal combustion engine or turbine engine which directly or indirectly drives the electrical generator 8. The combustion system 6 will preferably be an internal combustion engine which drives the electrical generator 8.

In many cases, prior to combusting the waste gas or liquid product 4 in the internal combustion engine, turbine engine, or other combustion system 6 for driving the electrical generator 8, it will be necessary to remove liquids (e.g., water and/or hydrocarbon liquids) from the waste gas or liquid product stream. Examples of devices 14 suitable for use in the inventive method and system 2 for removing liquids from the waste gas or liquid product stream 4 prior to combustion include, but are not limited to: API oil-water separators; basic oily water separators; knock out pots; plate separators; coalescing plate separators; coalescing separators; ponds or pools with oil skimming devices; column tower separators; pressure drop separators; electrical separators; basic wastewater treatment separation systems; industrial wastewater treatment separation systems; centrifugal oil-gas separators; induced gas floatation separation systems; and cyclone separators.

Similarly, in many cases, it will be necessary to remove solids such as particulates, salts, sand, dirt, metals, or other solid materials from the waste gas or liquid product stream 4 prior to combusting the waste gas or liquid product 4 in the internal combustion engine, turbine engine, or other combustion system 6. Examples of devices 16 suitable for use in the inventive method and system 2 for removing solids from the waste gas or liquid stream prior to combustion include, but are not limited to: cyclone separators; water cyclone separators; baghouses; electric separation systems; filter separators; coalescing separators; strainers; pressure drop separators; magnetic separation systems; and gravity separation systems.

The portable electrical power storage system 12 can comprise a single portable electrical power storage device or a portable set (e.g., an array or other grouping) of multiple electrical power storage devices. The portable electrical power storage system 12 will preferably comprise a portable rechargeable battery or a portable set of rechargeable batteries.

By way of example but not by way of limitation, the portable rechargeable battery, or each one of the rechargeable batteries of a portable set of batteries used in the portable electrical power storage system 12, can be: a lead-acid battery; a nickel cadmium battery; a nickel-metal hydride battery; a lithium ion battery; a lithium ion polymer battery; a zinc-air battery; a molten salt battery; an aluminum-ion battery; a vanadium redox-flow battery; a zinc-bromine battery; a zinc-cerium battery; a lead-acid deep cycle battery; a valve-regulated lead-acid battery; an absorbent glass mat battery; a gel battery; a glass battery; a lithium-air battery; a lithium ion lithium cobalt oxide battery (ICR); a lithium ion manganese oxide battery (IMR); a lithium ion polymer battery; a lithium iron phosphate battery; a lithium-sulfur battery; a lithium-titanate battery a thin film lithium-ion battery; a magnesium-ion battery; a vented cell type nickel-cadmium battery; a nickel hydrogen battery; a nickel-iron battery; a nickel metal hydride battery; a low self-discharge NiMH battery; a nickel-zinc battery; an organic radical battery; a polymer-based battery; a polysulfide bromide battery; a potassium-ion battery; a rechargeable alkaline battery; a rechargeable fuel battery; a rechargeable fuel cell battery; a silicon air battery; a silver-zinc battery; a silver calcium battery; a sodium-ion battery; a sodium-sulfur battery; a super iron battery; an ultra-battery; or a zinc ion battery.

The portable electrical power storage device or the portable set of electrical power storage devices of the portable electrical power storage system 12 can be positioned on or in a non-powered or powered vehicle 15, and/or in a cargo container 17, for conveniently transporting the portable electrical power storage device or the portable set of electrical power storage devices to and from the waste gas or liquid source location by land, on water, or both. By way of example, but not by way of limitation, the portable electrical power storage device or the portable set of electrical power storage devices forming the portable electrical power storage system 12 will preferably be positioned on a trailer or barge 15, and/or in a cargo container 17, for transport by truck, train, barge, ship, or aircraft.

In addition, if the portable electrical power storage system 12 comprises a cargo container 17 which contains the portable electrical power storage device or the portable set of electrical power storage devices, the electrical generator 8 of the inventive system 2, and also the internal combustion engine or turbine engine, or other combustion system 6 used in the inventive system 2, can be located in the cargo container 17 as well. Similarly, if the portable electrical power storage system 12 comprises a non-powered vehicle (e.g., a trailer or a barge) 15 or a powered vehicle on or in which the portable electrical power storage device or the portable set of electrical power storage devices is positioned, the electrical generator 8 of the inventive system 2, and also the internal combustion engine or turbine engine, or other combustion system 6 used in the inventive system 2, can be located on or in the non-powered or powered vehicle 15 as well.

Figure 2:
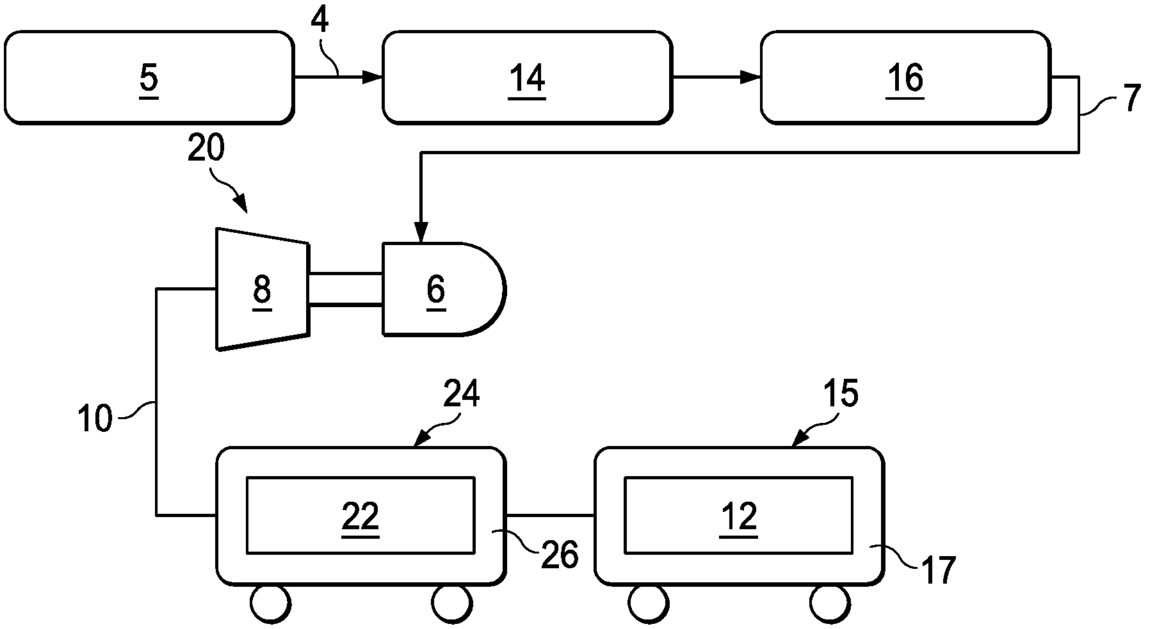
FIG. 2 schematically illustrates an alternative embodiment 20 of the inventive method and system for producing portable electrical energy from the waste gas or liquid product 4.

An alternative embodiment 20 of the inventive method and system for producing and using portable electrical energy is illustrated in FIG. 2. The inventive method and system 20 illustrated in FIG. 2 is identical to the inventive system 2 illustrated in FIG. 1 except that (a) the portable electrical power storage system 12 used in the inventive system 20 is a second portable electrical power storage system, (b) the inventive system 20 also includes a first portable electrical power storage system 22 which is also located at the source location for the waste gas or liquid product and is electrically linked to the generator 8, (c) the electrical energy 10 produced by the generator 8 is delivered to and stored in the first portable electrical power storage system 22, and (d) the electrical energy 10 stored in the first portable electrical power storage system 22 is subsequently delivered to and stored in the second portable electrical power storage system 12.

As with the second portable electrical power storage system 12, the first portable electrical power storage system 22 can comprise a single portable electrical power storage device or a portable set (e.g., an array or other grouping) of multiple electrical power storage devices. The first portable electrical power storage system 22 will preferably comprise a portable rechargeable battery or a portable set of rechargeable batteries. By way of example but not by way of limitation, the portable rechargeable battery or batteries forming the portable electrical power storage system 12 can be any of the same types of rechargeable batteries listed above as being suitable for use in the portable electrical power storage system 12. It will also be understood, however, that the type of portable rechargeable battery or batteries used in the first portable electrical power storage system 22 can be the same as or different from the type of portable rechargeable battery or batteries used in the second portable electrical power storage system 12.

As was also the case with the second portable electrical power storage system 12, the first portable electrical power storage device or the first portable set of electrical power storage devices forming the first portable electrical power storage system 22 can be positioned on or in a non-powered or powered vehicle 24, and/or in a cargo container 26, for conveniently transporting the portable electrical power storage device or the portable set of electrical power storage devices to and from the waste gas or liquid source location by land, on water, or both.

By way of example, but not by way of limitation, the portable electrical power storage device or the portable set of electrical power storage devices forming the first portable electrical power storage system 22 will preferably be positioned on a trailer or barge 24, and/or in a cargo container 26, for transport by truck, train, barge, ship, or aircraft.

In addition, if the first portable electrical power storage system 22 comprises a cargo container 26 which contains the portable electrical power storage device or the portable set of electrical power storage devices of the first power storage system 22, the electrical generator 8 of the inventive system 20, and also the internal combustion engine or turbine engine, or other combustion system 6 used in the inventive system 20, can be located in the cargo container 26 as well. Similarly, if the first portable electrical power storage system 22 comprises a non-powered vehicle (e.g., a trailer or a barge) 24 or a powered vehicle on or in which the portable electrical power storage device or the portable set of electrical power storage devices is positioned, the electrical generator 8 of the inventive system 20, and also the internal combustion engine or turbine engine, or other combustion system 6 used in the inventive system 20, can be located on or in the non-powered or powered vehicle 24 as well.

In the inventive method and system 20, as the quantity of waste gas or liquid produced at the source location diminishes over time, and the electrical energy produced at the site declines, the first portable electrical power storage system 22 can be disconnected and transported to a new source location for converting a waste gas or liquid product at the new source location into portable electrical energy. The second portable electrical power storage system 12, on the other hand, can be taken to any number of source locations to collect and transport the electrical energy which is being received and temporarily stored at these sites in any number of first portable electrical power storage systems 22.

Figure 3:
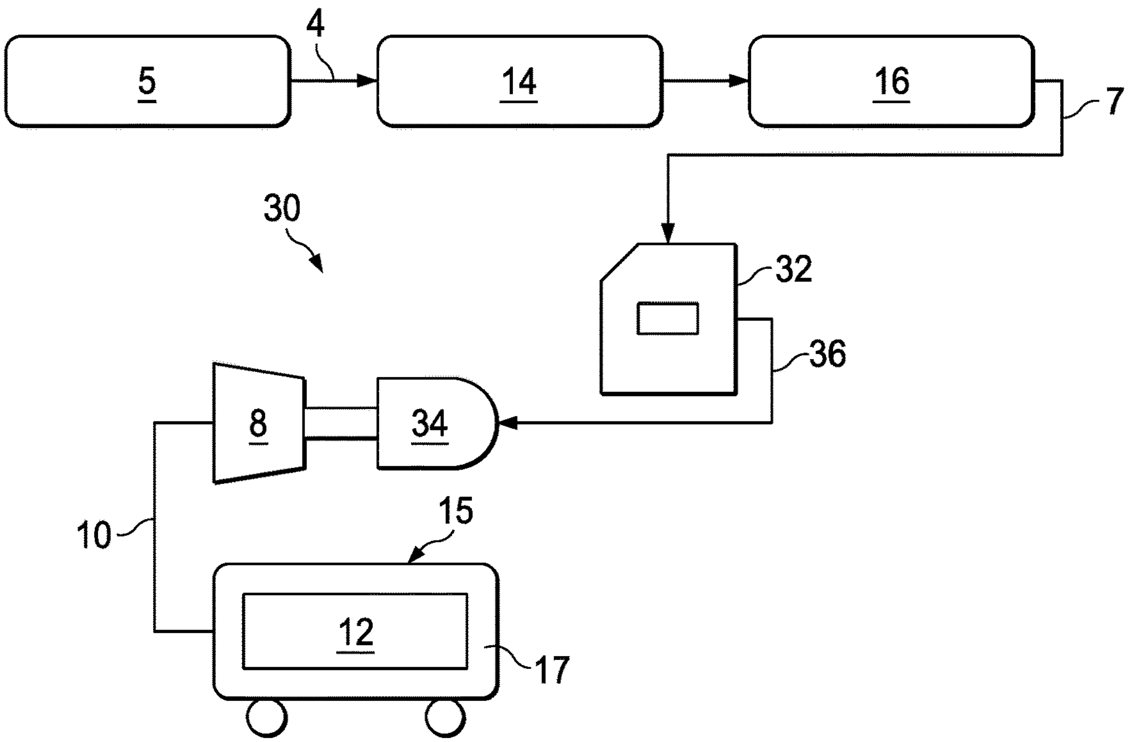
FIG. 3 schematically illustrates another alternative embodiment 30 of the inventive method and system for producing portable electrical energy from the waste gas or liquid product 4.

Another alternative embodiment 30 of the inventive method and system for producing and using portable electrical energy is illustrated in FIG. 3. The inventive method and system 30 illustrated in FIG. 3 can be identical to the inventive system 2 illustrated in FIG. 1 or the inventive system 20 illustrated in FIG. 2 except that: (a) the internal combustion engine or turbine engine 6 used in systems 2 and 20 is replaced with a boiler system 32 and a steam turbine 34 which are located at the source location; (b) the waste gas or liquid product 4 produced from the source 5 is combusted in the boiler 32 to produce steam 36; (c) the steam 36 flowing from the boiler 32 drives the steam turbine 34; and (d) the stream turbine 34 in turn drives the electrical generator 8 to produce the electrical energy 10 which is delivered to and stored in the portable electrical power storage system 12 or 22.

Figure 4:
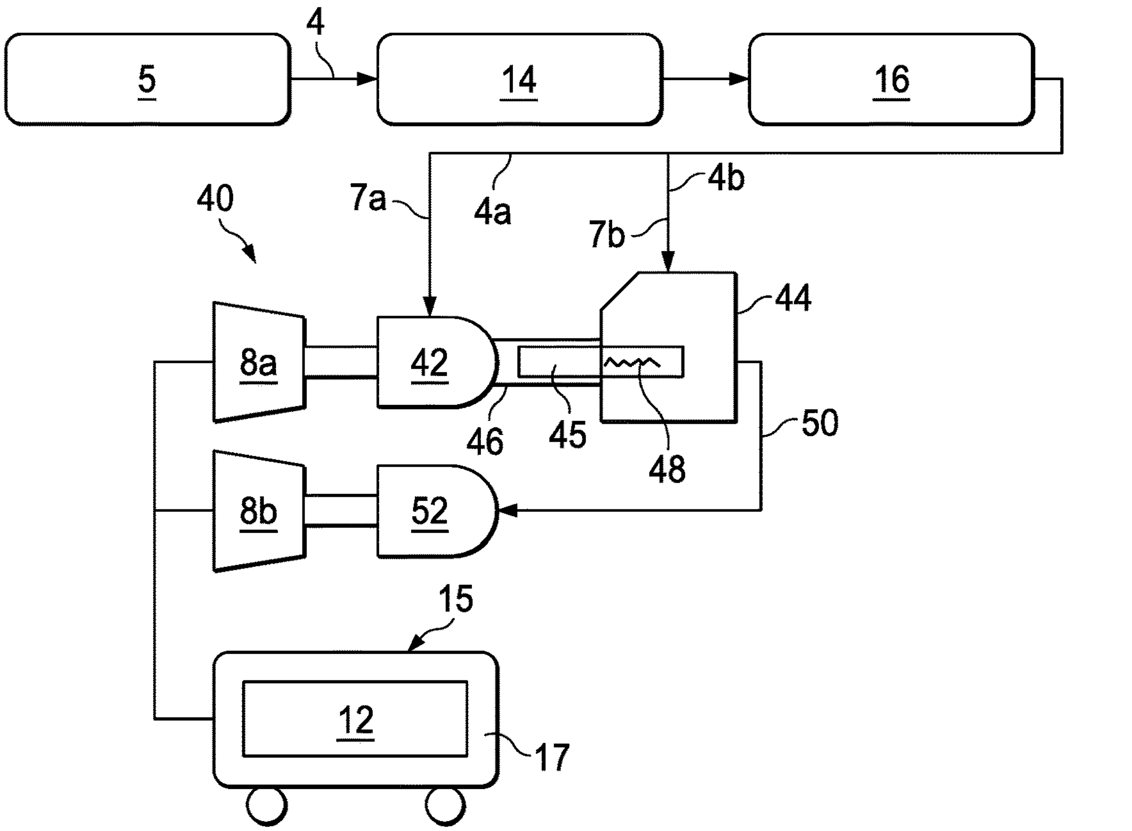
FIG. 4 schematically illustrates another alternative embodiment 40 of the inventive method and system for producing portable electrical energy from the waste gas or liquid product 4.

Another alternative embodiment 40 of the inventive method and system for producing and using portable electrical energy is illustrated in FIG. 4. The inventive system 40 illustrated in FIG. 4 is a combined cycle cogeneration system which is similar to a combination of the inventive system 2 (or system 20) and the inventive system 30 wherein: (a) a first portion **4*a* of the waste gas or liquid product 4 produced from the source 5 is delivered via a waste product line 7*a* to, and combusted in, an internal combustion engine or turbine engine 42; (b) the internal combustion engine or turbine engine 42 drives a first electrical generator 8*a* to produce a first amount of electrical energy which is delivered to and stored in a portable electrical power storage system 12 or 22; (c) a second portion 4*b* of the waste gas or liquid product 4 is conducted via a waste product line 7*b* to, and combusted in, a boiler system 44 (preferably using duct burners) to produce a first amount of steam; (d) the exhaust stream 46 from the internal combustion engine or turbine engine 42 is delivered via an exhaust line or duct 45 to the boiler system 44 and is conducted through a heat exchange element 48 in the boiler system 44 to produce a second amount of steam; (e) the first and second amounts of steam produced in boiler system 44 are combined to form a combined stream of steam 50 which drives a steam turbine 52; (f) the steam turbine 52 in turn drives a second electrical generator 8*b* to produce a second amount of electrical energy; and (g) the second amount of electrical energy is delivered from the second electrical generator 8*b* via an electrical connection to, and stored in, the portable electrical power storage system 12 or 22**.

In the inventive system 40, the internal combustion engine or turbine engine 42, the first electrical generator **8*a*, the boiler 44, the steam turbine 52, the second electrical generator 8*b*, and the portable electrical power storage system(s) 12 and/or 22** are all located at the source location.

In any of the inventive methods and systems 2, 20, 30 or 40, once the portable electrical storage system 12 has been charged at the source location, the portable electrical storage system 12 can be conveniently disconnected and transported from the source location to any other location as may be desired or necessary for (a) delivering the electrical energy stored in the portable electrical power storage device or the portable set of electrical power storage devices of the portable storage system 12 to an electrical power supply grid or system, (b) charging electric vehicles, (c) charging other stationary or portable electrical power storage devices or stationary or portable sets of electrical power storage devices, (d) charging one or more homes, buildings, manufacturing facilities, or businesses, (e) charging one or more municipalities, (f) providing supplemental power to one or more solar power systems or grids, (g) charging one or more electric trains, (h) charging one or more electric boats, (i) charging one or more electric aircraft, (j) etc.

In each case, any equipment needed for transferring the stored electrical energy will also be provided on the portable electrical storage system 12 and/or at (a) the delivery site, (b) the vehicle charging location, or (c) other charging site. Examples of such equipment items can include, but are not limited to: transformers for converting the voltage of the stored electrical energy; any necessary connectors for downloading the electrical energy to the receiving systems or devices; any induction or other systems needed for wirelessly transferring the electrical energy; etc.

When using the electrical energy stored in the portable electrical storage system 12 for charging electric vehicles or other devices or power systems, the portable storage system 12 can be transported from the waste gas or liquid source location to any desired charging location, including remote locations where charging facilities have not been and cannot otherwise be economically provided. At such charging locations, the stored electrical energy can, for example, be (a) sold to individual consumers for charging vehicles or other devices, (b) used by a business or other organization for charging a fleet of electric vehicles, (c) used as supplemental electricity in combination with intermittent sources of electricity such as wind or solar, (d) used as a primary source of electricity for remote locations, (e) etc.

In any vehicle charging application, the inventive method can optionally also include the further step of providing updated information to the users of the portable electrical energy, preferably by providing an app for smart phones or other hand-held devices, regarding such things as: (i) the location of the electric vehicle charging station, (ii) the availability of the electrical energy at the electric vehicle charging station, (iii) the amount of the electrical energy which is available at the electric vehicle charging station, (iv) the cost of the electrical energy which is available at the electric vehicle charging station, and/or (v) a rate or speed of transfer of the electrical energy at the electric vehicle charging station for charging electric vehicles.

Figure 5:
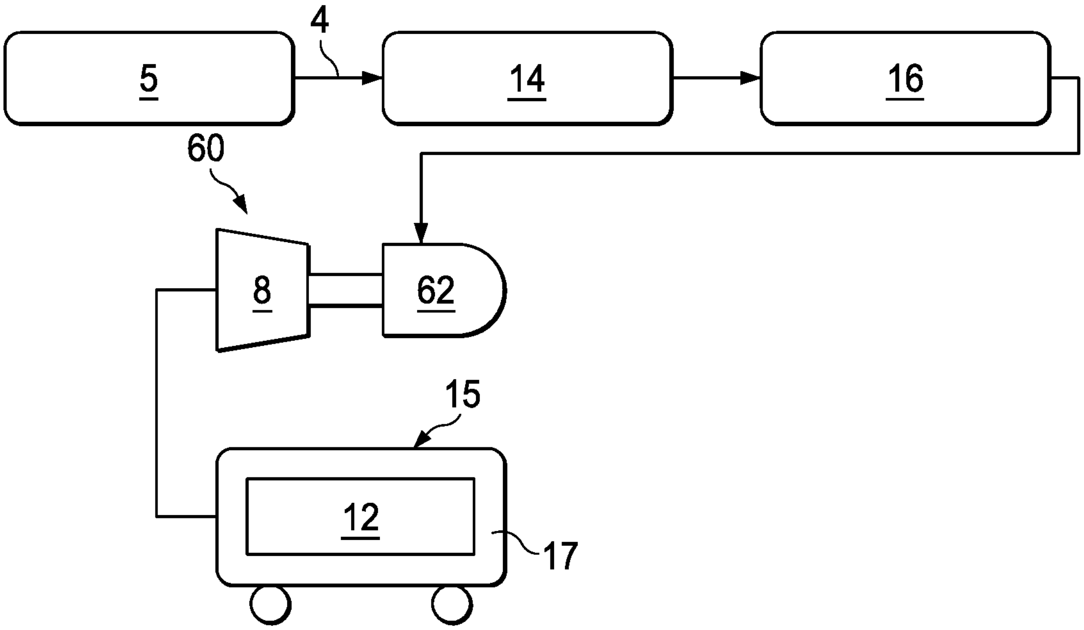
FIG. 5 schematically illustrates another alternative embodiment 60 of the inventive method and system for producing portable electrical energy from a waste gas product 4.

Another embodiment 60 of the inventive method and system is illustrated in FIG. 5. The inventive method and system 60 can be identical to the inventive method and system 2 illustrated in FIG. 1, or the inventive method and system 20 illustrated in FIG. 2, except that the combustion system 6 used in the inventive systems 2 and 20 is replaced with a flow turbine 62, located at the source location, which directly or indirectly drives the electrical generator 8. Specifically, in the inventive method and system 60, the flow turbine 62 which drives the electrical generator 8 is powered by directing the flow of a waste gas product 4 produced at the source location through the flow turbine 62.

The inventive method and system 60 can be used in any case where the pressure and the flow rate of the waste gas product 4 produced at the source location are sufficient for driving the flow turbine 62 for operating the electrical generator 8. The pressure of the waste gas product 4 provided at the source location for operating the inventive system 60 will preferably be at least 0.05 psig (typically greater than 30 psig) and the flow rate of the waste gas product stream 4 will preferably be at least 5,000 SCFD (typically at least 500,000 SCFD).

The following Table 1 illustrates the amount of electrical energy which would be generated, for example, in the state of North Dakota if, rather than flaring waste gas and liquid products produced from the oil and/or gas wells currently operating in the state, the waste gas and liquid products were instead used to produce portable electrical energy using the inventive combined cycle cogeneration system 40 illustrated in FIG. 4. The inventive combined cycle cogeneration system 40 converts approximately 63% of the energy generated from burning waste fuel into electrical power. Table 1 provides the amount of electrical power which would be generated per hour and per day for (a) one average well currently operating in the state, (b) a typical system in the state wherein the waste fuel from multiple wells in a single field is currently being delivered to a common flaring point, and (c) all of the wells currently in operation in the entire state of North Dakota.

TABLE 1

| Well Head High Pressure Gas | One Wellhead | Multiple Wellhead | North Dakota |
|---|---|---|---|
| Flow, MScfd | 500 | 15000 | 275000 |
| LHV Btu/SCF | 1300 | 1300 | 1300 |
| MM Btu/d | 650 | 19500 | 357500 |
| MM Btu/hr | 27 | 813 | 14896 |
| Heat Released, MW | 7.9 | 238.1 | 4364.5 |
| Efficiency, Combined Cycle | 63% | 63% | 63% |
| Electricity, MW for 1 hour | 5.00 | 150 | 2,750 |
| Electricity, MW/h for 1 Day | 120.0 | 3,600 | 65,991 |

The following Table 2 provides corresponding emissions saving estimates for (i) one average well, (ii) a typical multiple wellhead flaring system, and (iii) the entire state of North Dakota based upon using the waste fuel which is currently being flared in the state per hour or day to replace the combustion energy sources which would otherwise have to be burned in order to produce the amount of electrical energy in question.

TABLE 2

ESTIMATE OF EMISSIONS REDUCTION BY USING WASTE FUEL FOR POWER PRODUCTION

| | One Wellhead | Multiple Wellhead | North Dakota |
|---|---|---|---|
| NO*x* Emisions Reduction | | | |
| NO*x* Emisions from Flaring Gas, #/MM Btu | 0.20 | 0.20 | 0.20 |
| Heat Release from flaring, MM Btu/hr | 27 | 813 | 14,896 |
| NO*x* Emisions from Flaring Gas, #/hr | 5.4 | 163 | 2,979 |
| NO*x* Emisions from Flaring Gas, #/day | 130 | 3,900 | 71,500 |
| NO*x* Emisions from Flaring Gas, US Tons/year | 24 | 712 | 13,049 |
| NO*x* Emisions from Flaring Gas, US Tons/Equipment Life | 471 | 14,138 | 259,188 |
| CO Emmision Reduction | | | |
| CO Emisions from Flaring Gas, #/MM Btu | 0.05 | 0.05 | 0.05 |
| Heat Release from flaring, MM Btu/hr | 27 | 813 | 14,896 |
| CO Emisions from Flaring Gas, #/hr | 1.4 | 41 | 745 |
| CO Emisions from Flaring Gas, #/day | 33 | 975 | 17,875 |
| CO Emisions from Flaring | 6 | 178 | 3,262 |

TABLE 2-continued

ESTIMATE OF EMISSIONS REDUCTION BY USING WASTE FUEL FOR POWER PRODUCTION

| | One Wellhead | Multiple Wellhead | North Dakota |
|---|---|---|---|
| Gas, US Tons/year | | | |
| CO Emisions from Flaring Gas, US Tons/Equipment Life | 118 | 3,534 | 64,797 |
| CO2 Emissions Reduction | | | |
| CO2 Emissions from Flaring Gas, SCFH/(MM Btu/hr) | 1,108 | 1,108 | 1,108 |
| Heat Release from flaring, MM Btu/hr | 27 | 813 | 14,896 |
| CO2 Emissions from Flaring Gas, SCFH | 30,018 | 900,551 | 16,510,100 |
| CO2 Emissions from Flaring Gas, MM SCFD | 0.72 | 21.6 | 396 |
| CO2 Emissions from Flaring Gas, MM SCFY | 263 | 7,889 | 144,628 |
| CO2 Emissions from Flaring Gas, MM SCFH/Equipment Life | 5,223 | 156,696 | 2,872,757 |

The above numbers are based upon the assumption that the engery generated by the use of the waste fuel replaces other energy that would be used to generate the same amount of electrical power Thus, the present invention is well adapted to carry out the objectives and attain the ends and advantages mentioned above as well as those inherent therein. While presently preferred embodiments and steps have been described for purposes of this disclosure, the invention is not limited in its application to the details of the preferred embodiments and steps. Numerous changes and modifications will be apparent to those in the art. Such changes and modifications are encompassed within this invention as defined by the claims. In addition, unless expressly stated, the phraseology and terminology employed herein are for the purpose of description and not of limitation.

What is claimed is:

1. A method of producing portable electrical energy from a hydrocarbon-containing waste gas and preventing disposal of the hydrocarbon-containing waste gas by flaring, the method comprising the steps of:

a) producing the hydrocarbon-containing waste gas at a production site which is (i) an oil and/or gas well site, or an oil and/or gas production field, from which a liquid and/or gas product for transport from the production site is produced and the hydrocarbon-containing waste gas is an associated gas product produced at the production site which is not recovered with the liquid and/or gas product for transport, (ii) a landfill or other garbage or waste facility and the hydrocarbon-containing waste gas is a methane-containing gas which is produced and given off by the landfill or other garbage or waste facility, or (iii) an off-shore or on-shore loading facility for oil, hydrocarbon liquids, gas products, and/or liquified gas products and the hydrocarbon-containing waste gas is a gas which is vented by the off-shore or on-shore loading facility during operation;

b) driving an electrical generator at the production site to produce electrical energy by combusting the hydrocarbon-containing waste gas at the production site at which the hydrocarbon-containing waste gas is produced, with or without first removing solids and/or a liquid therefrom, in an internal combustion engine which directly or indirectly drives the electrical generator;

c) directly or indirectly delivering the electrical energy produced in step (b) from the electrical generator to, and storing the electrical energy in, a portable electrical power storage device or a portable set of electrical power storage devices which is temporarily located at the production site at which the hydrocarbon-containing waste gas is produced, the portable electrical power storage device or the portable set of electrical power storage devices being different from the electrical generator;

d) after step (c), transporting the portable electrical power storage device or the portable set of electrical power storage devices to a second geographical site, different from the production site at which the hydrocarbon-containing waste gas is produced; and e) discharging a portion or all of the electrical energy stored in the portable electrical power storage device or the portable set of electrical power storage devices at the second geographical site to a receiving unit or system at the second geographical site.

2. The method of claim 1 comprising producing the hydrocarbon-containing waste gas in step (a) from the landfill or other garbage or waste facility and the hydrocarbon-containing waste gas being the methane-containing gas which is produced and given off by the landfill or other garbage or waste facility.

3. The method of claim 1 comprising producing the hydrocarbon-containing waste gas in step (a) from the off-shore or on-shore loading facility for oil, hydrocarbon liquids, gas products, and/or liquified gas products and the hydrocarbon-containing waste gas being vented by the off-shore or on-shore loading facility for oil, hydrocarbon liquids, gas products, and/or liquified gas products.

4. The method of claim 1 wherein the portable electrical power storage device or the portable set of electrical power storage devices comprises a rechargeable battery or a set of rechargeable batteries.

5. The method of claim 4 wherein the rechargeable battery or each one of the rechargeable batteries of the set of rechargeable batteries is: a lead-acid battery; a nickel cadmium battery; a nickel-metal hydride battery; a lithium ion battery; a lithium ion polymer battery; a zinc-air battery; a molten salt battery; an aluminum-ion battery; a vanadium redox-flow battery; a zinc-bromine battery; a zinc-cerium battery; a lead-acid deep cycle battery; a valve-regulated lead-acid battery; an absorbent glass mat battery; a gel battery; a glass battery; a lithium-air battery; a lithium ion lithium cobalt oxide battery (ICR); a lithium ion manganese oxide battery (IMR); a lithium ion polymer battery; a lithium iron phosphate battery; a lithium-sulfur battery; a lithium-titanate battery; a thin film lithium-ion battery; a magnesium-ion battery; a vented cell type nickel-cadmium battery; a nickel hydrogen battery; a nickel-iron battery; a nickel metal hydride battery; a low self-discharge NiMH battery; a nickel-zinc battery; an organic radical battery; a polymer-based battery; a polysulfide bromide battery; a potassium-ion battery; a rechargeable alkaline battery; a rechargeable fuel battery; a rechargeable fuel cell battery; a silicon air battery; a silver-zinc battery; a silver calcium battery; a sodium-ion battery; a sodium-sulfur battery; a super iron battery; an ultra-battery; or a zinc ion battery.

6. The method of claim 1 wherein the portable electrical power storage device or the portable set of electrical power storage devices is positioned in a cargo container, and/or on or in a non-powered or powered vehicle, for transporting the portable electrical power storage device or the portable set of electrical power storage devices by land, on water, or both.

7. The method of claim 6 wherein the electrical generator is also positioned in the cargo container, and/or on or in the non-powered or powered vehicle, for transport with the portable electrical power storage device or the portable set of electrical power storage devices.

8. The method of claim 7 wherein the internal combustion engine is also positioned in the cargo container, and/or on or in the non-powered or powered vehicle, for transport with the portable electrical power storage device or the portable set of electrical power storage devices.

9. The method of claim 6 wherein the portable electrical power storage device or the portable set of electrical power storage devices is positioned on or in a trailer.

10. The method of claim 6 wherein the portable electrical power storage device or the portable set of electrical power storage devices is positioned on or in a barge.

11. The method of claim 1 wherein the receiving unit or system at the second geographical site is an electrical power supply grid or system and the electrical energy which is discharged in step (e) from the portable electrical power storage device or the portable set of electrical power storage devices is discharged into the electrical power supply grid or system.

12. The method of claim 1 wherein the receiving unit or system at the second geographical site is an electric vehicle or an electric vehicle charging system and the electrical energy which is discharged in step (e) from the portable electrical power storage device or the portable set of electrical power storage devices is discharged to the electric vehicle or the electric vehicle charging system.

13. The method of claim 12 further comprising the step of advising users of the electrical energy stored in the portable electrical power storage device or the portable set of electrical power storage devices, via an app for a smart phone or other hand-held device, of:

the location of the electric vehicle charging location, the availability of the electrical energy at the electric vehicle charging location, the amount of the electrical energy which is available at the electric vehicle charging location, the cost of the electrical energy which is available at the electric vehicle charging location, and/or a rate or speed of transfer of the electrical energy at the electric vehicle charging location for charging electric vehicles.

14. The method of claim 1 wherein the receiving unit or system at the second geographical site to which the electrical energy is discharged from the portable electrical power storage device or the portable set of electrical power storage devices in step (e) is: another stationary or portable electrical power storage device or stationary or portable set of electrical power storage devices; one or more homes, buildings, manufacturing facilities, or businesses; one or more municipalities; one or more solar power systems or grids; one or more electric trains; one or more electric boats; or one or more electric aircraft.

15. The method of claim 1 wherein:

the production site at which the hydrocarbon-containing waste gas is produced is a first production site;

after step (e), the portable electrical power storage device or the portable set of electrical power storage devices is transported to a second production site, different from the first production site, at which a hydrocarbon-containing waste gas is produced; and the method further comprises combusting the hydrocarbon-containing waste gas produced at the second production site in an internal combustion engine to directly or indirectly drive an electrical generator to produce electric energy which is received and stored in the portable electrical power storage device or the portable set of electrical power storage devices.

16. The method of claim 1 comprising producing the hydrocarbon-containing waste gas from the oil and/or gas well site, or the oil and/or gas production field, from which the liquid and/or gas product for transport from the production site is produced and the hydrocarbon-containing waste gas being the associated gas product produced at the production site which is not recovered with the liquid and/or gas product for transport.

17. A method of producing portable electrical energy comprising the steps of:

a) producing a gas or liquid product at a production site, the production site being (i) an oil and/or gas well site, (ii) an oil and/or gas production field, (iii) a landfill or other garbage or waste facility, (iv) an off-shore or on-shore loading facility for oil, hydrocarbon liquids, gas products, and/or liquified gas products, or (v) another geographical site at which the gas or liquid product is produced;

b) combusting a first amount of the gas or liquid product at the production site at which the gas or liquid product is produced in an internal combustion engine or a turbine engine to directly or indirectly power a first electrical generator to produce a first amount of electrical energy;

c) directly or indirectly delivering the first amount of electrical energy produced in step (b) to, and storing the first amount of electrical energy in, a portable electrical power storage device or a portable set of electrical power storage devices at the production site at which the gas or liquid product is produced;

d) combusting a second amount of the gas or liquid product at the production site at which the gas or liquid product is produced to produce a first amount of steam;

e) using an exhaust stream from the internal combustion engine or turbine engine to produce a second amount of steam at the production site at which the gas or liquid product is produced;

f) using the first and the second amounts of steam to drive a steam turbine at the production site at which the gas or liquid product is produced which powers a second electrical generator at the production site at which the gas or liquid product is produced to produce a second amount of electrical energy;

g) directly or indirectly delivering the second amount of electrical energy to, and storing the second amount of electrical energy in, the portable electric power storage device or the portable set of electrical power storage devices at the production site at which the gas or liquid product is produced; and h) after steps (c) and (g), transporting the portable electrical power storage device or the portable set of electrical power storage devices to a second geographical site which is different from the production site at which the gas or liquid product is produced.

18. A method of producing portable electrical energy comprising the steps of:

a) producing a gas or liquid product at a production site, the production site being (i) an oil and/or gas well site, (ii) an oil and/or gas production field, (iii) a landfill or other garbage or waste facility, (iv) an off-shore or on-shore loading facility for oil, hydrocarbon liquids, gas products, and/or liquified gas products, or (v) another geographical site at which the gas or liquid product is produced;

b) driving a first electrical generator at the production site to produce electrical energy by combusting a first amount of the gas or liquid product at the production site at which the gas or liquid product is produced (i) in an internal combustion engine which directly or indirectly drives the first electrical generator or (ii) in a turbine engine which directly or indirectly drives the first electrical generator;

c) directly or indirectly delivering the electrical energy produced in step (b) from the first electrical generator to, and storing the electrical energy in, a portable electrical power storage device or a portable set of electrical power storage devices which is temporarily located at the production site at which the gas or liquid product is produced, the portable electrical power storage device or the portable set of electrical power storage devices being different from the first electrical generator;

d) after step (c), transporting the portable electrical power storage device or the portable set of electrical power storage devices to a second geographical site, different from the production site at which the gas or liquid product is produced; and e) discharging a portion or all of the electrical energy stored in the portable electrical power storage device or the portable set of electrical power storage devices at the second geographical site to a receiving unit or system at the second geographical site, wherein the method further comprises the steps, prior to step (d), of:

combusting a second amount of the gas or liquid product at the production site at which the gas or liquid product is produced to produce a first amount of steam, using an exhaust stream from the internal combustion engine or the turbine engine to produce a second amount of steam at the production site at which the gas or liquid product is produced, using the first and second amounts of steam to drive a steam turbine at the production site at which the gas or liquid product is produced which drives a second electrical generator at the production site at which the gas or liquid product is produced to produce an additional amount of electrical energy, and directly or indirectly delivering the additional amount of electrical energy from the second electrical generator to, and storing the additional amount of electrical energy in, the portable electrical power storage device or the portable set of electrical power storage devices at the production site at which the gas or liquid product is produced.

19. A method of producing portable electrical energy comprising the steps of:

a) producing a gas or liquid product at a production site, the production site being (i) an oil and/or gas well site, (ii) an oil and/or gas production field, (iii) a landfill or other garbage or waste facility, (iv) an off-shore or on-shore loading facility for oil, hydrocarbon liquids, gas products, and/or liquified gas products, or (v) another geographical site at which the gas or liquid product is produced;

b) driving an electrical generator at the production site to produce electrical energy by combusting the gas or liquid product at the production site at which the gas or liquid product is produced (i) in an internal combustion engine which directly or indirectly drives the electrical generator, (ii) in a turbine engine which directly or indirectly drives the electrical generator, or (iii) to produce steam for a steam turbine which directly or indirectly drives the electrical generator;

c) indirectly delivering the electrical energy produced in step (b) from the electrical generator to, and storing the electrical energy in, a second portable electrical power storage device or a second portable set of electrical power storage devices which is temporarily located at the production site at which the gas or liquid product is produced, the second portable electrical power storage device or the second portable set of electrical power storage devices being different from the electrical generator;

d) after step (c), transporting the second portable electrical power storage device or the second portable set of electrical power storage devices to a second geographical site, different from the production site at which the gas or liquid product is produced; and e) discharging a portion or all of the electrical energy stored in the second portable electrical power storage device or the second portable set of electrical power storage devices at the second geographical site to a receiving unit or system at the second geographical site, wherein in step (c), the electrical energy produced in step (b) is indirectly delivered to the second portable electrical power storage device or the second portable set of electrical power storage devices at the production site at which the gas or liquid product is produced by delivering the electrical energy produced in step (b) from the electrical generator to, and storing the electrical energy in, a first portable electrical power storage device or a first portable set of electrical power storage devices at the production site at which the gas or liquid product is produced, the first portable electrical power storage device or the first portable set of electrical power storage devices being different from the electrical generator, and then delivering the electrical energy stored in the first portable electrical power storage device or the first portable set of electrical power storage devices to, and storing the electrical energy in, the second portable electrical power storage device or the second portable set of electrical power storage devices at the production site at which the gas or liquid product is produced;

the first portable electrical power storage device or the first portable set of electrical power storage devices is positioned in a first cargo container, and/or on or in a first non-powered or powered vehicle;

the electrical generator is also positioned in the first cargo container, and/or on or in the first non-powered or powered vehicle, for transport with the first portable electrical power storage device or the first portable set of electrical power storage devices;

the second portable electrical power storage device or the second portable set of electrical power storage devices is positioned in a second cargo container, different from the first cargo container, and/or on or in a second non-powered or powered vehicle, different from the first non-powered or powered vehicle; and during step (d), the first portable electrical power storage device or the first portable set of electrical power storage devices positioned in the first cargo container, and/or on or in the first non-powered or powered vehicle, remains at the production site at which the gas or liquid product is produced and continues to operate in accordance with step (c) to store the electrical energy produced by the electrical generator which is delivered from the electrical generator to the first portable electrical power storage device or the first portable set of electrical power storage devices.

20. The method of claim 19 wherein the first portable electrical power storage device or the first portable set of electrical power storage devices comprises a rechargeable battery or a set of rechargeable batteries.

21. The method of claim 19 wherein, in step (b), the gas or liquid product is combusted at the production site at which the gas or liquid product is produced in an internal combustion engine, or in a turbine engine, which directly or indirectly drives the electrical generator and the internal combustion engine or the turbine engine is also positioned in the first cargo container, and/or on or in the first non-powered or powered vehicle, for transport with the first portable electrical power storage device or the first portable set of electrical power storage devices.

22. A method of producing portable electrical energy comprising the steps of:

a) producing a gas or liquid product at a production site, the production site being (i) an oil and/or gas well site, (ii) an oil and/or gas production field, (iii) a landfill or other garbage or waste facility, (iv) an off-shore or on-shore loading facility for oil, hydrocarbon liquids, gas products, and/or liquified gas products, or (v) another geographical site at which the gas or liquid product is produced;

b) combusting a first amount of the gas or liquid product at the production site at which the gas or liquid product is produced in an internal combustion engine or a turbine engine to directly or indirectly power a first electrical generator to produce a first amount of electrical energy;

c) directly or indirectly delivering the first amount of electrical energy produced in step (b) to, and storing the first amount of electrical energy in, a portable electrical power storage device or a portable set of electrical power storage devices at the production site at which the gas or liquid product is produced;

d) producing steam using heat from combustion of a second amount of the gas or liquid product at the production site at which the gas or liquid product is produced and from heat exchange with an exhaust stream from the internal combustion engine or the turbine engine;

e) using the steam to drive a steam turbine at the production site at which the gas or liquid product is produced which powers a second electrical generator at the production site at which the gas or liquid product is produced to produce a second amount of electrical energy;

f) directly or indirectly delivering the second amount of electrical energy to, and storing the second amount of electrical energy in, the portable electric power storage device or the portable set of electrical power storage devices at the production site at which the gas or liquid product is produced; and g) after steps (c) and (f), transporting the portable electrical power storage device or the portable set of electrical power storage devices to a second geographical site which is different from the production site at which the gas or liquid product is produced.

23. A method of producing portable electrical energy from a hydrocarbon-containing waste gas and preventing disposal of the hydrocarbon-containing waste gas by flaring, the method comprising the steps of:

a) producing the hydrocarbon-containing waste gas at a production site which is (i) an oil and/or gas well site, or an oil and/or gas production field, from which a liquid and/or gas product for transport from the production site is produced and the hydrocarbon-containing waste gas is an associated gas product produced at the production site which is not recovered with the liquid and/or gas product for transport, (ii) a landfill or other garbage or waste facility and the hydrocarbon-containing waste gas is a methane-containing gas which is produced and given off by the landfill or other garbage or waste facility, or (iii) an off-shore or on-shore loading facility for oil, hydrocarbon liquids, gas products, and/or liquified gas products and the hydrocarbon-containing waste gas is a gas which is vented by the off-shore or on-shore loading facility during operation;

b) driving an electrical generator at the production site to produce electrical energy by combusting the hydrocarbon-containing waste gas at the production site at which the hydrocarbon-containing waste gas is produced, with or without first removing solids and/or a liquid therefrom, in a turbine engine which directly or indirectly drives the electrical generator;

c) directly or indirectly delivering the electrical energy produced in step (b) from the electrical generator to, and storing the electrical energy in, a portable electrical power storage device or a portable set of electrical power storage devices which is temporarily located at the production site at which the hydrocarbon-containing waste gas is produced, the portable electrical power storage device or the portable set of electrical power storage devices being different from the electrical generator;

d) after step (c), transporting the portable electrical power storage device or the portable set of electrical power storage devices to a second geographical site, different from the production site at which the hydrocarbon-containing waste gas is produced; and e) discharging a portion or all of the electrical energy stored in the portable electrical power storage device or the portable set of electrical power storage devices at the second geographical site to a receiving unit or system at the second geographical site.

24. A method of producing portable electrical energy from a hydrocarbon-containing waste gas and preventing disposal of the hydrocarbon-containing waste gas by flaring, the method comprising the steps of:

a) producing the hydrocarbon-containing waste gas at a production site which is (i) an oil and/or gas well site, or an oil and/or gas production field, from which a liquid and/or gas product for transport from the production site is produced and the hydrocarbon-containing waste gas is an associated gas product produced at the production site which is not recovered with the liquid and/or gas product for transport, (ii) a landfill or other garbage or waste facility and the hydrocarbon-containing waste gas is a methane-containing gas which is produced and given off by the landfill or other garbage or waste facility, or (iii) an off-shore or on-shore loading facility for oil, hydrocarbon liquids, gas products, and/or liquified gas products and the hydrocarbon-containing waste gas is a gas which is vented by the off-shore or on-shore loading facility during operation;

b) driving an electrical generator at the production site to produce electrical energy by combusting the hydrocarbon-containing waste gas at the production site at which the hydrocarbon-containing waste gas is produced, with or without first removing solids and/or a liquid therefrom, in a boiler to produce steam for a steam turbine which directly or indirectly drives the electrical generator;

c) directly or indirectly delivering the electrical energy produced in step (b) from the electrical generator to, and storing the electrical energy in, a portable electrical power storage device or a portable set of electrical power storage devices which is temporarily located at the production site at which the hydrocarbon-containing waste gas is produced, the portable electrical power storage device or the portable set of electrical power storage devices being different from the electrical generator;

d) after step (c), transporting the portable electrical power storage device or the portable set of electrical power storage devices to a second geographical site, different from the production site at which the hydrocarbon-containing waste gas is produced; and e) discharging a portion or all of the electrical energy stored in the portable electrical power storage device or the portable set of electrical power storage devices at the second geographical site to a receiving unit or system at the second geographical site.

* * * * *